(12) United States Patent
Zhang et al.

(10) Patent No.: US 9,702,662 B1
(45) Date of Patent: Jul. 11, 2017

(54) ELECTRONIC SIGHTING DEVICE WITH REAL-TIME INFORMATION INTERACTION

(71) Applicant: Huntercraft Limited, Albany, NY (US)

(72) Inventors: Lin Zhang, Albany, NY (US); Chunhua Shi, Albany, NY (US); Sang Su, Albany, NY (US)

(73) Assignee: HUNTERCRAFT LIMITED, Albany, NY (US)

( * ) Notice: Subject to any disclaimer, the term of this patent is extended or adjusted under 35 U.S.C. 154(b) by 0 days.

(21) Appl. No.: 14/979,193

(22) Filed: Dec. 22, 2015

(51) Int. Cl.
| | |
|---|---|
| *F41G 1/473* | (2006.01) |
| *F41G 1/38* | (2006.01) |
| *F41G 3/08* | (2006.01) |
| *F41G 11/00* | (2006.01) |
| *F41G 3/32* | (2006.01) |
| *F41G 3/06* | (2006.01) |
| *H04N 5/77* | (2006.01) |
| *H04N 5/225* | (2006.01) |

(52) U.S. Cl.
CPC .............. *F41G 1/473* (2013.01); *F41G 1/38* (2013.01); *F41G 3/06* (2013.01); *F41G 3/08* (2013.01); *F41G 3/32* (2013.01); *F41G 11/001* (2013.01); *H04N 5/2254* (2013.01); *H04N 5/772* (2013.01)

(58) Field of Classification Search
CPC ..... F41G 1/38; F41G 3/06; F41G 3/08; F41G 3/2605; F41G 3/2611; F41G 1/473; F41G 3/32; F41G 11/001; F41J 5/00; G01C 3/04; G06G 7/80; H05N 5/772; H05N 5/2254

USPC .......... 42/111, 113, 119, 122, 123, 130, 131; 235/404, 414, 417
See application file for complete search history.

(56) References Cited

U.S. PATENT DOCUMENTS

| | | | |
|---|---|---|---|
| 5,026,158 A * | 6/1991 | Golubic | F41G 1/38 356/252 |
| 6,899,539 B1 * | 5/2005 | Stallman | F41H 13/00 345/156 |
| 7,421,816 B2 * | 9/2008 | Conescu | F41G 1/473 42/114 |
| 8,464,451 B2 * | 6/2013 | Mcrae | F41A 17/06 42/1.01 |
| 9,410,769 B1 * | 8/2016 | Zhang | F41G 3/06 |
| 2006/0005447 A1 * | 1/2006 | Lenner | F41G 3/06 42/111 |

(Continued)

*Primary Examiner* — Bret Hayes
(74) *Attorney, Agent, or Firm* — Novick, Kim & Lee, PLLC; Allen Xue

(57) ABSTRACT

The present invention relates to a sighting device, and specifically relates to an electronic sighting device with real-time information interaction. The sighting device comprises a field-of-view obtaining unit, a display unit; a sighting circuit unit, a sensor module, a positioning unit, and an interaction unit, wherein shooting vibration of a gun is judged by a vibration sensor in the sensor module, and then, the interaction unit is connected with internet or a remote display terminal to send the real-time information acquired by the sensor module and/or image information acquired by the field-of-view obtaining unit during shooting process to the internet or the remote display terminal, to achieve information collection and recording of each-time shooting by the electronic sighting device and achieve real-time interaction of the collected information with the internet or the remote display terminal.

21 Claims, 10 Drawing Sheets

(56) References Cited

U.S. PATENT DOCUMENTS

| | | | |
|---|---|---|---|
| 2012/0183930 A1* | 7/2012 | Dribben | F41G 3/26 434/19 |
| 2013/0174464 A1* | 7/2013 | Chung | F41G 1/35 42/113 |
| 2013/0286239 A1* | 10/2013 | Lupher | F41G 3/06 348/222.1 |
| 2014/0166750 A1* | 6/2014 | Chen | F41G 1/40 235/404 |
| 2015/0362288 A1* | 12/2015 | Sammut | F41G 3/08 235/404 |
| 2016/0084617 A1* | 3/2016 | Lyren | F41G 3/08 42/135 |
| 2016/0180532 A1* | 6/2016 | Katramados | F41J 5/10 382/103 |

* cited by examiner

ELECTRONIC SIGHTING DEVICE WITH REAL-TIME INFORMATION INTERACTION

TECHNICAL FIELD

The present invention relates to a sighting device, and more specifically relates to an electronic sighting device with real-time information interaction.

BACKGROUND

Traditional sights usually include mechanical sights and optical sights, wherein the mechanical sights generally refer to performing sighting mechanically through a metallic sight such as a rear sight, a front sight, and a notch; the optical sights refer to imaging with optical lens, where a target image and a line of sight are superimposed on a same focal plane, such that a point of sighting will not be affected even with slight eye offset.

Traditional shooting requires user to sight with single eye, and the other eye is closed to avoid influence of different scenes acquired with two eyes on shooting; however, in the case of sighting with single eye, it is inconvenient for the user to observe the circumstance by user's side, such that it is hard to avoid influence on the shooting from a sudden change of surroundings. Therefore, during the sighting process, it will make shooting operation easier if two-eye sighting is realized.

Meanwhile, there is a huge potential risk problem in use of a gun, for instance, the illegals use guns for illegal activities, or the user is accidentally injured in the process of hunting; but, all the current sighting devices can't realize precise recording of the shooting process and accurate real-time acquisition of videos prior to or after the shooting.

SUMMARY OF THE INVENTION

In order to solve the above problems effectively, the present invention provides an electronic sighting device with real-time interaction of relevant information between an electronic sighting device and a gun, the electronic sighting device can real-time interacts shooting video to the remote display terminal for displaying.

The invention provides an electronic sighting device with real-time information interaction, the electronic sighting device comprises a housing, defining an accommodation space with a field-of-view obtaining unit, a range finding unit, a display unit, a sensor module, a positioning unit, an interaction unit and a sighting circuit unit disposed therein; the sighting circuit unit can display the image information acquired by the field-of-view obtaining unit on the display unit, and can accurately forecast the impact point, so as to facilitate calibration and shooting for a user.

Further, the sensor module comprises a vibration sensor and a photoelectric sensor; the vibration sensor is mounted at the rear side of the bottom of the electronic sighting device and used for acquiring the vibration signal of a gun or the electronic sighting device; and the photoelectric sensor is mounted at a trigger of a gun and used for judging whether the trigger is pulled, and if receiving both a vibration signal and a trigger pulling signal, determining this vibration is a shooting vibration and sending the signals to a control unit on the circuit unit of the sighting device for indication; the control unit records current shooting vibration, and collects and saves the shooting time, the shooting position, the shooting video recorded by the field-of-view obtaining unit before and after shooting, and the information acquired by the sensor during shooting; the interaction unit uploads the above collected information and the number of the gun (or user information of the sighting device) to a cloud platform via internet for storing and recording.

Further, the vibration sensor comprises a piezoelectric vibrator, a signal processing substrate, a vibration signal emission means, a vibration sensor housing and a switch; all of the piezoelectric vibrator, the signal processing substrate, and the vibration signal emission means are fixed in the vibration sensor housing; the vibration sensor is disposed on the base of the electronic sighting device at one side opposite to the shooting direction; by the vibration sensor and the photoelectric sensor, a vibration signal of a gun is acquired, in combination with the trigger pulling signal acquired by the photoelectric sensor, to achieve indication of the sighting device, and the shooting time, the shooting position, the shooting video recorded by the field-of-view obtaining unit before and after shooting, and the information acquired by the sensor during shooting are recorded.

Further, besides the vibration sensor and the photoelectric sensor, the sensor module also includes a wind speed wind direction sensor, a geomagnetic sensor, a temperature sensor, an air pressure sensor and a humidity sensor, to acquire the information of wind speed, angle of the sighting device, temperature, air pressure and humidity.

Further, the electronic sighting device also comprises a method for real-time interaction of the image information acquired by the field-of-view obtaining unit, the method is used for realizing transmission of the image information acquired by the field-of-view obtaining unit to any one display terminal by internet, and the display terminal displays the image information acquired by the field-of-view obtaining unit. Further, an entirety of the housing is of a detachable structure;

Further, the field-of-view obtaining unit and the rang-finding unit are fixed within the accommodation space of the housing, the rang-finding unit comprising a signal emitting end and a signal receiving end, the field-of-view obtaining unit comprising an optical image obtaining end, all of the signal emitting end, the signal receiving end, and the optical image obtaining end being disposed at a front end of the housing, the signal emitting end and the signal receiving end are symmetrically distributed at an upper side of the optical image obtaining end, a plane formed by the optical image obtaining end being angled with a vertical side of a gun.

Further, both the signal emitting end and the signal receiving end project above the optical image obtaining end.

Further, the signal emitting end and the signal receiving end are disposed at an upper end or a lower end of the optical image obtaining end.

Further, the front end of the housing is also provided with a protection unit.

Further, the photoelectric sighting device further comprises three field-of-view regulating units (which are key on the display unit, key provided on the housing and key connected to the housing, respectively).

Further, at a read end of the housing is provided the display unit, within the accommodation space of the hosing are provided the sighting circuit unit and a battery assembly (power supply), the field-of-view obtaining unit and the display unit being connected through the sighting circuit unit, the battery assembly supplying power to power units within the photoelectric sighting device.

Further, on the housing is provided a key unit, the key unit comprising an external key assembly and a socket assembly, the external key assembly being provided at a place facilitating the user to use and touch, the socket assembly being connected to the external key assembly through an external connection line, the external key assembly being connected with a secure clip and fixed via the secure clip to a position of a barrel or gun facilitating the user to touch, the key unit being connected onto the sighting circuit unit.

Further, the sighting circuit unit comprises a interface board and a core board, where a field-of-view driving circuit of the field-of-view obtaining unit, a ranging control circuit in the range-finding unit, a key control circuit in the key unit, and a battery control circuit of the battery assembly are all connected onto the core board through the interface board, and a display driving unit of the display unit is connected onto the core board.

Further, the core board is connected with a memory card, the memory card is provided therein with a bullet information data base and two ballistic calculation model systems; a user can select the two ballistic models according to sensor setting, and each of the ballistic models may be a six-degree-of-freedom rigidity model or a flat ballistic model.

Further, the present invention further provides a calibration method for realizing accurate shooting during a shooting process of an photoelectric sighting device, the calibration method being applied to the photoelectric device in the above embodiments, the calibration method comprising: setting a target within a field of view of the photoelectric sighting device, and measuring a distance from the photoelectric sighting device to the target through a range-finding unit of the photoelectric sighting device; invoking a plane coordinate via a key unit so as to load onto the display unit, and applying a coordinate center to sight; viewing the field of view of the display unit, controlling a gun, aligning the coordinate center with the target; upon alignment, shooting a first bullet, and obtaining a first impact point on the target, the display unit print-screening an image having the first impact point; and adjusting the field of view of a display screen of the photoelectric sighting device, such that a center of the plane coordinate coincides with the first impact point; accomplishing the calibration.

Further, the calibration method may also possibly comprise adding a simulated calibration prior to a first shooting calibration, the simulated calibration simulating an impact point through the ballistic models.

Further, the calibration method may further comprise adding a second shooting calibration after the first shooting calibration, so as to enhance the preciseness of calibration.

In conjunction with the accompanying drawings, features of the present invention will be described in more detail in the following detailed depiction of various embodiments of the present invention.

DETAILED DESCRIPTION OF THE EMBODIMENTS

In order to make the objectives, technical solutions and advantages of the invention more clear, the present invention is further described in detail below with the drawings and embodiments. It should be made out, the embodiments described herein is only used for interpreting but not limiting the present invention.

In contrast, the present invention covers any substitution, amendment, and equivalent method and solution with respect to the spirits and scope of this invention defined by the Claims. Furthermore, in the detail description of the present invention hereinafter, some specific technical features are described thoroughly, such that the public can better understand the invention.

Figure 1:
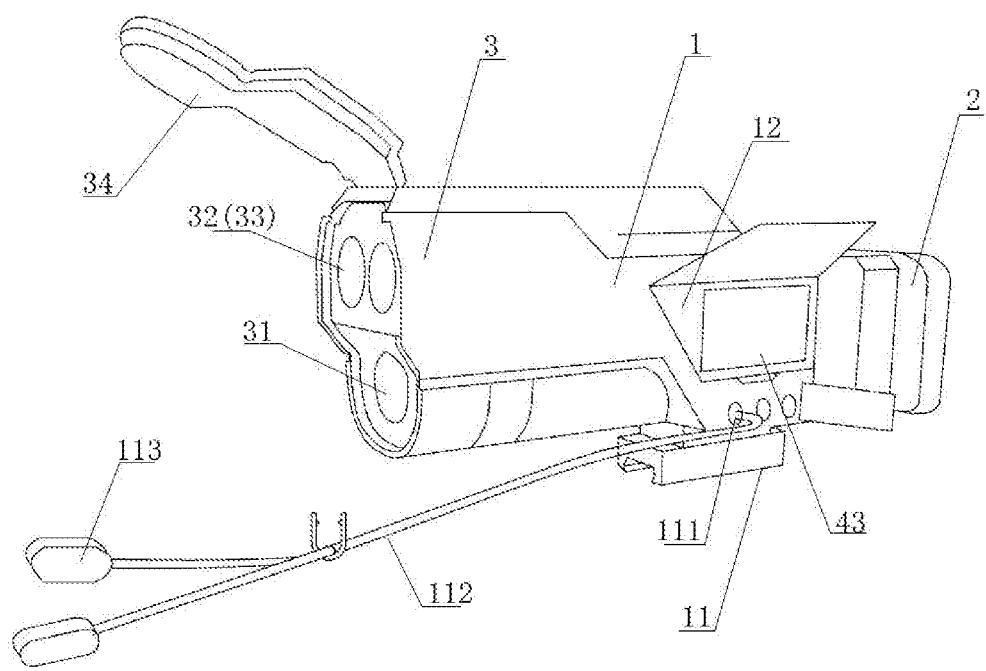
FIG. 1 shows a diagram of external view of an electronic sighting device in an embodiment of the present invention.

Referring to FIG. 1, the schematic perspective view of an electronic sighting device with real-time information interaction in the present invention, it shows all aspects of the electronic sighting device in the present invention; the sighting device in the present invention can be mounted on multiple types of sniper rifles, such as FR-F1 sniper rifle, M40 sniper rifle, etc. When the inventive electronic sighting device is mounted on a gun, it can be mounted firmly and stably through an installer, and realizes precise mounting on a rail or a receiving device of the gun by simultaneously applying calibration method of the gun and sighting device.

The electronic sighting device with real-time information interaction provided in the present invention comprises a housing 1 with an outline size determining the outline dimensions of the entire electronic sighting device, the interior space of the housing 1 determines the dimensions of the circuit disposed within the housing 1, specifically, the housing 1 defines an accommodation space disposed therein with field-of-view obtaining unit 31, display unit 21 and other components and parts; the field-of-view obtaining unit 31 is mounted at the front end 3 of the housing, the display unit 21 is mounted at rear end 2 of the housing, the other components and parts include a sighting circuit unit, a power supply, a sensor module, and an interaction unit, all mounted in the interior of the housing 1, the field-of-view obtaining unit 31 acquires the image information of the sighed field of view and sends the information to the display unit 21 for display through the sighting circuit unit, the sighting circuit unit comprises a control unit, the display unit 21 displays the image information and reticle for sighting, and the reticle is always in the central position of the display unit 21; a user can realizes sighting through aligning the reticle center with the sighted object in the image information further to accomplish shooting; and the power supply supplies power to global parts of the electronic sighting device.

The present invention adopts a structure having a housing front end and a housing rear end; besides, the housing front end and the housing rear end may realize an individual replacement. When a part of the photoelectric sighting device is damaged, it may be replaced according to the space and housing part where it is located, such that the photoelectric sighting device can be repaired; or, it may be dismounted according to the space and housing part where it is located so as to replace the damaged part individually, thereby realizing repair of the photoelectric sighting device.

The sensor module comprises a vibration sensor 6 and a photoelectric sensor 7, the vibration sensor 6 acquires a vibration signal of a gun or the electronic sighting device, the photoelectric sensor 7 acquires a varied electric signal produced by pulling the trigger of the gun, and the vibration signal and the electric signal are sent to the control unit on the circuit unit of the sighting device, and indicated by the display unit; the control unit records the current shooting vibration and collects and saves the shooting time, shooting position, shooting videos recorded by the field-of-view obtaining unit 31 before and after shooting, and information acquired by the sensor module during shooting; the interaction unit uploads the above collected information and a number of the gun (or user information of the sighting device) to a cloud platform by internet for storing and recording; and the interaction unit is a wireless internet reception device.

Besides the vibration sensor 6 and the photoelectric sensor 7, the sensor module also includes all of or a combination of several of a wind speed wind direction sensor, a geomagnetic sensor, a temperature sensor, an air pressure sensor and a humidity sensor, to acquire the information of wind speed, temperature, air pressure and humidity, respectively. In one embodiment, the geomagnetic sensor is three-axis magnetometer MAG3110, and the wind speed wind direction sensor is externally provided on the electronic sighting device and connected on the circuit unit of the sighting device.

Figure 4:
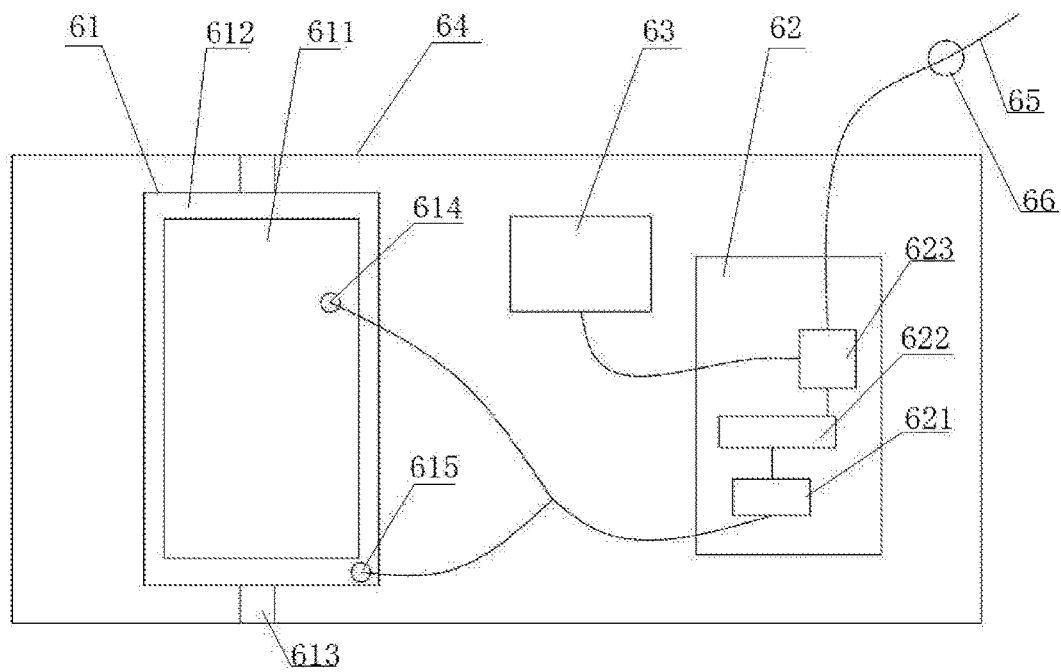
FIG. 4 shows a structural diagram of vibration sensor of an electronic sighting device in an embodiment of the present invention.

As shown in FIG. 4, the vibration sensor 6 comprises a piezoelectric vibrator 61, a signal processing substrate 62, a vibration signal emission means 63, and a vibration sensor housing 64; all of the piezoelectric vibrator 61, the signal processing substrate 62, and the vibration signal emission means 63 are fixed in the vibration sensor housing 64.

The piezoelectric vibrator 61 comprises a piezoelectric element 611 made of lead zirconate titanate and a vibration board 612 made of copper phosphate or other similar metals, both in a shape of flat plate, but it is not limited to the above structure and materials under the condition of realizing the technical effect of the present invention, the two ends of the vibration board 612 are bonded by a binder 613 and fixed on the vibration sensor housing 64; the piezoelectric element 611 is firmly fixed on one side surface of the vibration board 612, and has a surface area less than that of the vibration board 612, specifically, it is fixed through a binding layer having a thickness not greater than 5 μm, and the piezoelectric element 611 and the vibration board 612 are the acquisition part of the vibration sensor.

In the embodiment of the present invention, the piezoelectric member 611 has dimensions of 4 mm in length, 2 mm in width and 0.4 mm in thickness, and is made of lead zirconate titanate; the vibration board 612 has dimensions of 5 mm in length, 2.5 mm in width and 0.5 mm in thickness, and is made of phosphor bronze; and it is not limited to the above materials and dimensions.

The piezoelectric member 611 is provided with a first electrode 614 on the surface thereof opposite to the vibration board; the vibration board 612 is provided with a second electrode 615 on the surface thereof connected with the piezoelectric member 611; and both the first and second electrodes 614 and 615 are connected with the signal processing substrate 62 via leads;

The signal processing substrate 62 includes a charge and voltage conversion processing unit 621, a filter processing unit 622 and a signal amplification processing unit 623, connected in sequence, both the first and second electrodes 614 and 615 are connected on the charge and voltage conversion processing unit 621, the signal amplification processing unit 623 is connected onto the power supply of the electronic sighting device via a cable 65 while connected to the vibration signal emission means 63.

Wherein, the charge and voltage conversion processing unit 621 coverts the inputted charges into a voltage signal with low impedance, the filter processing unit 622 has a function of setting a desired frequency band for measurement of the sensor through extracting a signal in a desired frequency band from the inputted signal, the signal amplification processing unit 623 has the function of signal inputting.

A switch 66 is provided on the cable 65 for connecting the circuit unit of the sighting device, the switch 66 is used for controlling the operation and shut-down of the vibration sensor 61, the power supply of the electronic sighting device supplies power for the charge and voltage conversion processing unit 621, the filter processing unit 622, the signal amplification processing unit 623 and the vibration signal emission unit 63.

Figure 5:
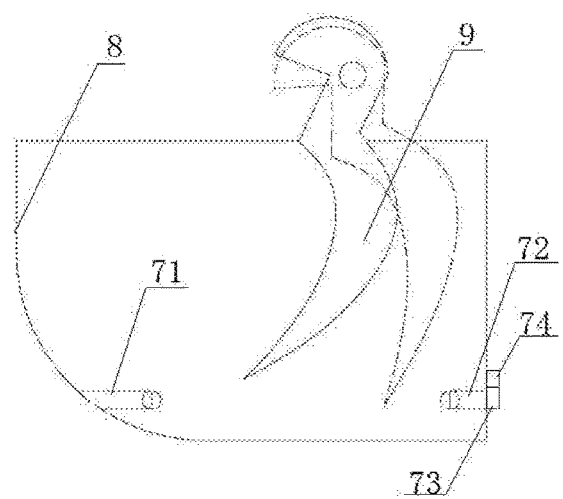
FIG. 5 shows a structural diagram of the trigger in an embodiment of the present invention.

As shown in FIG. 5, the photoelectric sensor 7 comprises a photosignal emission end 71, a photosignal reception end 72, a photosignal conversion unit 73 and a photoelectric sensor wireless emission end 74. The photosignal emission end 71 is disposed at the bottom of a trigger retainer 8 at the side facing the trigger 9, the photosignal reception end 72 is provided at the bottom of the trigger retainer 8 at the other side opposite to the facing-trigger side, and the position of photosignal emission end 71 is opposite to that of the photosignal reception end 72, such that after the trigger 9 is pulled, it is placed between the photosignal emission end 71 and the photosignal reception end 72, so as to hinder the photosignal reception end 72 from receiving the photosignal, further to cause a change of the photosignal and that there is no photosignal to be received, as a result, there is no photosignal to be converted into an electric signal, and the photoelectric sensor wireless emission end 74 stops signaling to the sighting circuit unit, at this moment, the control unit of the sighting circuit unit judges that the trigger is pulled and records that this vibration is shooting vibration by combining with received vibration signal sent by the vibration sensor.

The photosignal reception end is connected with the wireless emission end of the photoelectric sensor, which is connected to the sighting circuit unit, by the photosignal conversion unit.

The vibration sensor 6 is disposed on the rear side surface of the base 11 of the electronic sighting device, specifically on a side surface opposite to the sighting direction of the electronic sighting device, the vibration sensor 6 is disposed on the rear side surface of the base 11 of the electronic sighting device, both the surfaces of the piezoelectric member 611 and the vibration board 612 are parallel to the rear side surface of the base 11 to facilitate acquisition of vibration signal; during the shooting process of gun, due to that strong recoil will generate a vibration vertical to the rear side surface of the base 11, the structure of the vibration sensor 6 in the present invention will not acquire the vibration signal of vibration of the side surfaces of a gun and the sighting device, thereby avoiding interference of non-shooting vibration of the gun, meanwhile, setting a threshold further avoid interference of non-shooting vibration of the gun; therefore, the structure of the vibration sensor 6 in the present invention ensures the accuracy of vibration signal acquisition.

One embodiment in the present invention also includes a method for real-time interaction of the video information acquired by the field-of-view obtaining unit. The method is used for realizing real time transferring, via internet, of the image information acquired by the field-of-view obtaining unit on the sighting device to any one display terminal for displaying the image information.

The method comprises the following steps of:

1, setting a time range of acquiring the image information via the interaction unit by the field-of-view obtaining unit; wherein, the operation of time range setting via the interaction unit can be accomplished by operating on the remote display terminal, or by operating the electronic sighting device by a user;

2, allowing the field-of-view obtaining unit to acquire the image information in field of view and send the information to the interaction unit via the sighting circuit unit, and allowing the interaction unit to calculate a new reference time in correspondence to each-frame image in the image information within the time range;

the new reference time in step 2 is calculated in a way where it is calculated with a reference time, specifically by adopting the timestamp in correspondence to nth-frame image information plus an average mean of transmission delays of previous (n−1) frames of images within set reference time range, to calculate a new reference time for the frames of the video; the reference time is local time when the field-of-view obtaining unit starts acquisition of the image information; the reference time range is set by the interaction unit from when the field-of-view obtaining unit starts acquisition of the image information to when the field-of-view obtaining unit ends the acquisition;

n is greater than 1.

3, writing the new reference time in correspondence to video into decoder in the remote display terminal, and then, in the process of acquiring the image information by the display terminal, there will be new reference time in correspondence to the image information, which is correspondingly matched with the new reference time, therefore, in case of occurring display data loss, the follow-up image display will not be disordered;

4, allowing the remote display terminal to match time-stamp in correspondence to each-frame image with subsequently received image information and display after decoding.

Applying the method for real-time interaction of the video information acquired by the field-of-view obtaining unit, in case of severe data package loss, it will not influence follow-up video display, furthermore, this method is simple without modification of the video source and addition of interaction process of reception end and source end, reduces occupied operation internal storage of the electronic sighting device, and improves the working efficiency of the entire electronic sighting device.

The field-of-view obtaining unit 31 can be an integrated video camera. The lens zoom multiple of the field-of-view obtaining unit can be selectively varied based on actual applications; the integrated video camera as employed in the present invention is 3-18× video camera made by Sony, but not limited to the above model and zoom multiple. The integrated video camera is disposed at the foremost end of the photoelectric sighting device; meanwhile the front end of the integral camera is equipped with a UV lens and a lens cap 34. The lens cap 34 may perform a 270° flip to fully cover the front end of the housing, which protects the field-of-view obtaining unit from not being hurt, protects the lens and facilitates cleaning.

Figure 2:
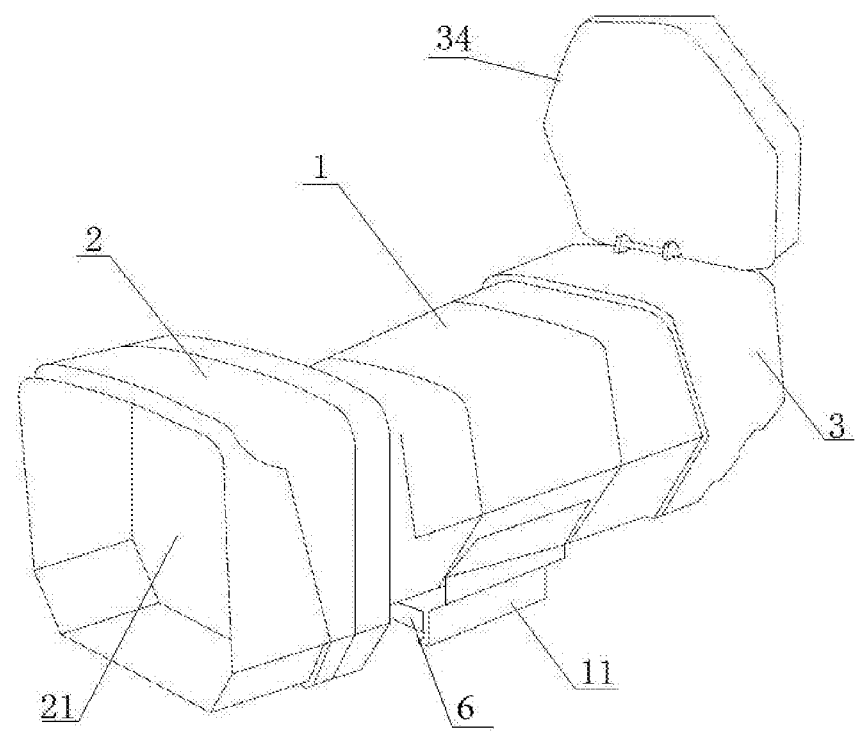
FIG. 2 shows another diagram of external view of an electronic sighting device in an embodiment of the present invention.
Figure 3:
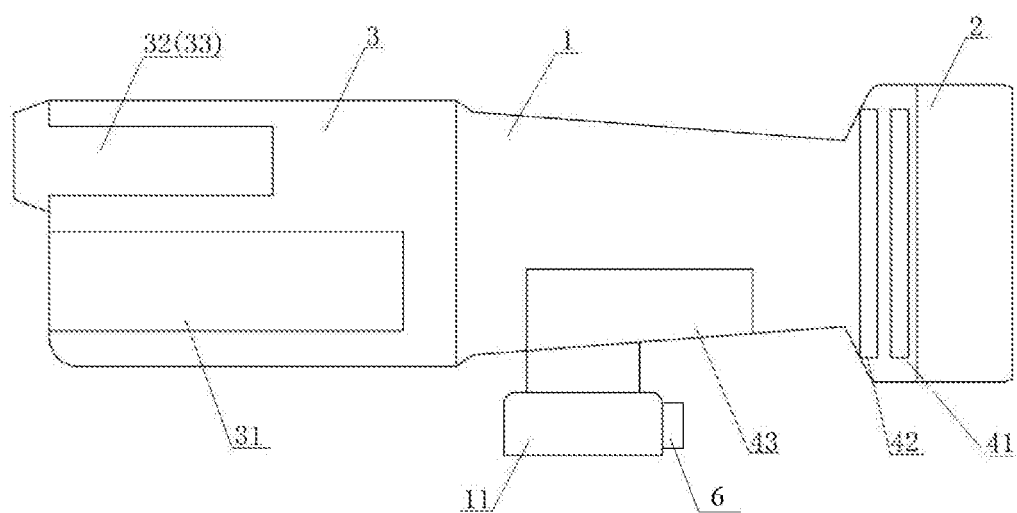
FIG. 3 shows a structural sectional view of an electronic sighting device in an embodiment of the present invention.

As shown in FIGS. 2 and 3, in the above embodiment, the photoelectric sighting device comprises a range-finder that is a laser range-finder. The range-finder is located within the housing 1. The laser range-finder is a pulse-type laser range-finder. The ranging principle of the pulse-type laser range-finder is first finding the time needed for a round trip of the laser as to the to-be-measured distance, and then calculating the to-be-measured distance through the following equation using this time:

$$L=ct/2$$

In the expression, L denotes the to-be-measured distance, c denotes a light velocity, while t denotes flying time of the laser.

Figure 6:
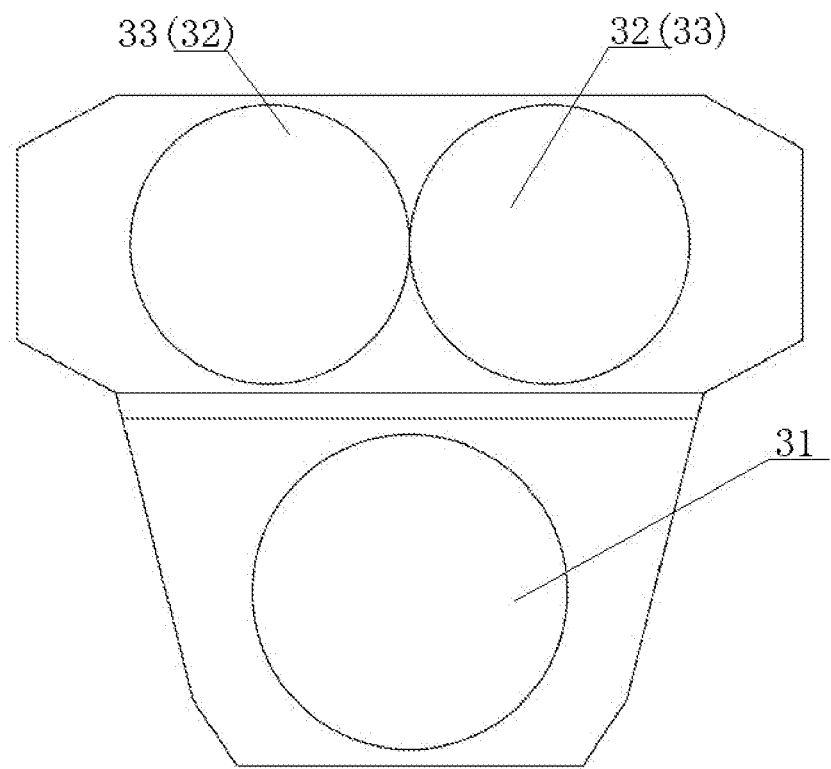
FIG. 6 shows a diagram of a front end of a housing of an electronic sighting device in an embodiment of the present invention FIG. 7 a system block diagram of an electronic sighting device in an embodiment of the present invention.

As shown in FIG. 6, the laser range-finder comprises a laser emitting end 32 and a laser receiving end 33. Both the laser emitting end 32 and laser receiving end 33 are disposed at a front end of the housing 1 and symmetrically distributed above the camera of the integrated video camera. The laser emitting end 32, laser receiving end 33, and the camera of the integrated video camera form an equilateral inverted triangle or an isosceles inverted triangle. Both the laser emitting end 32 and the laser receiving end 33 project above the front end of the housing 1, and the laser emitting end 32 and the laser receiving end 33 have a certain height difference over the field-of-view obtaining unit 31; moreover, the laser emitting end 32 and the laser receiving end 33 project above the housing front end 3. Such design narrows the housing internal space occupied by the laser range-finder. By projecting the extra-long portions of the laser emitting end 32 and the laser receiving end 33 outside of the housing front end 3, a high integration of the internal space of housing 1 is realized, such that the electrical-optic sighting device becomes more miniaturized, more flexible, and more portable; additionally, because the thickness of the object lens of a common field-of-view obtaining unit is higher than the thickness of the lens of the laser emitting end and receiving end, this design may reduce the laser range-finding error.

The lens cap 34 as mentioned in the above embodiment may cover the field-of-view obtaining unit as well as the front end of the laser range-finder, so as to protect the laser range-finder from being damaged.

The laser range-finder according to the embodiments of the present invention adopts a semiconductor laser with a work wavelength of 905 nanometer or 1540 nanometer. First, it avoids damage to the human body by the laser; meanwhile, the photoelectric detector can accurately determine the start and end points of the laser pulse and accurately measure the flying time of the laser. By controlling the frequency of the reference clock pulse above 1.5 GHz, error will be reduced.

The sighting circuit unit disposed within the housing 1 for connecting the field-of-view obtaining unit 31 and the display unit 21 comprises a CPU core board 41 and an interface board 42. The interface board 42 is connected to the CPU core board 41. Specifically, the input and output of the CPU core board 41 are connected through a serial port at a bottom side of the interface board 42, and the CPU core board 41 is disposed at one side of the display unit 21 display screen relative to the inside of the housing 1. The interface board 42 is disposed at one side of the CPU core board 41 opposite to the display screen. The display screen, CPU core board 41, and the interface board 42 are disposed parallel to each other. The integrated video camera and the range-finder are connected to the interface board 42 through a wiring, the image information acquired by the integrated video camera and the distance information acquired by the range finder are sent to CPU core board 41 by the interface board 42, and then displayed on the display screen and sent to the interaction unit via the CPU core board 41.

The CPU core board 41 may be connected to a memory card via the interface board 42 or directly connected to the memory card. In the embodiments of the present invention, a memory card slot is provided at a top position of the CPU core board 41. The memory card is plugged into the memory card slot. The memory card may store information. The stored information may be provided to the CPU core board 41 for calculation of a ballistic equation. The memory card may also store feedback information transmitted by the CPU core board 41.

A USB interface is also provided at the memory card slot edge side at the top of the CPU core board 41. Through the USB interface, information from the CPU core board 41 may be outputted, or the software program disposed within the CPU core board 41 may be upgraded and optimized.

Figure 7:
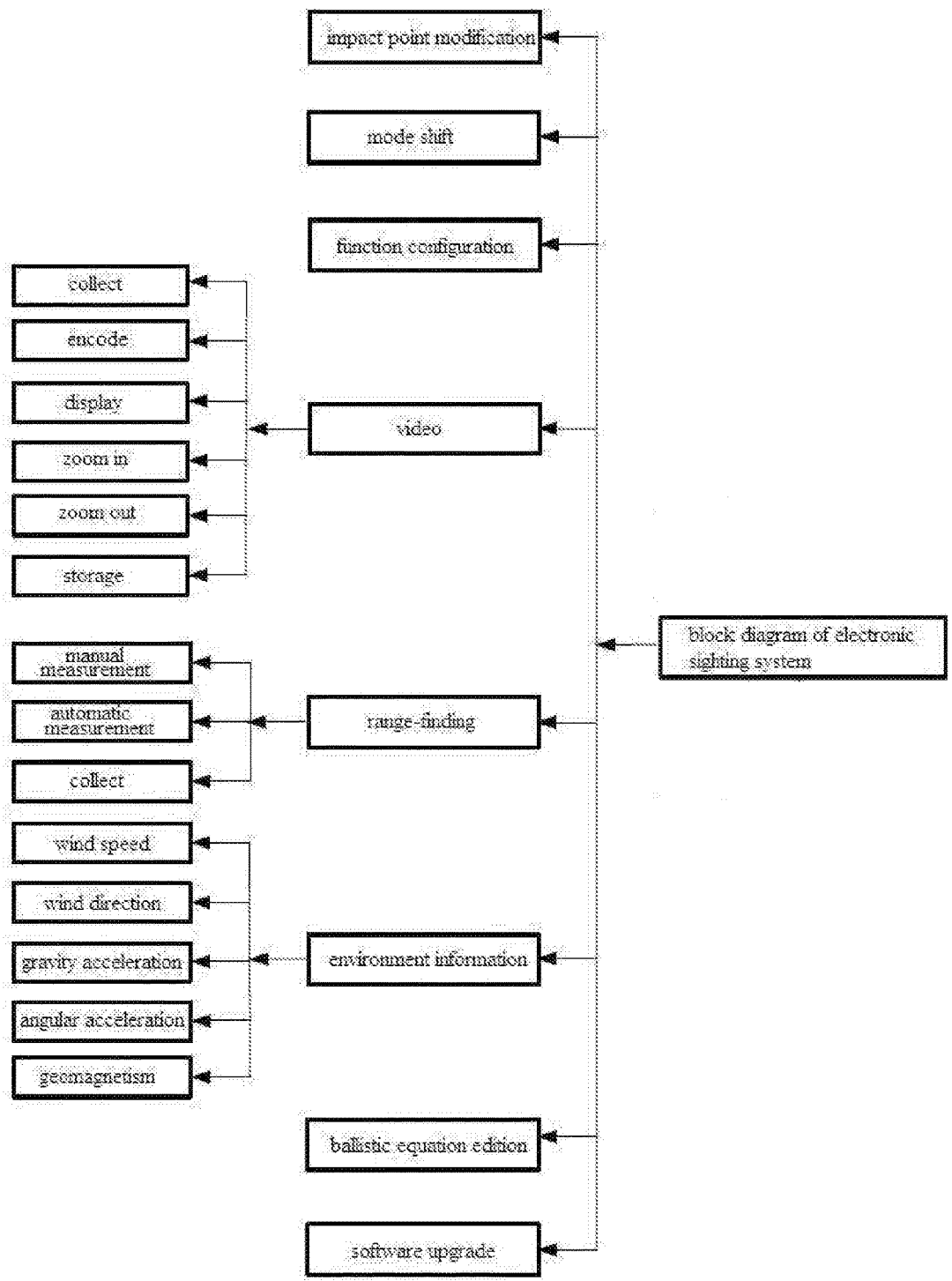
Figure 8:
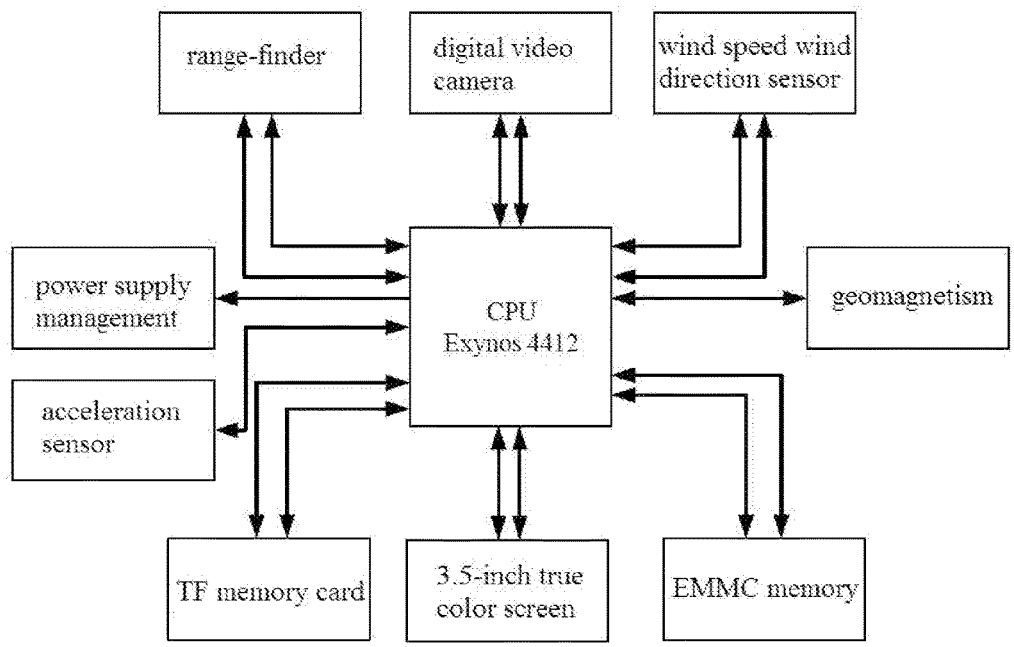
FIG. 8 shows a structural diagram of a sensor module of an electronic sighting device in an embodiment of the present invention

As shown in FIG. 7-8, the sensor module also includes an acceleration sensor, in one embodiment, wherein the acceleration sensor and the geomagnetic sensor are integrated on the CPU core board 41, the acceleration sensor is a chip MPU-6050 integrated with a gyroscope and an accelerometer, the wind speed wind direction sensor is connected on the interface board 42, the temperature sensor, barometric sensor, and humidity sensor may be integrated on the CPU core board or connected onto the CPU core board through the interface board 42. All of the above sensors employ a 11C (or 12C, $I^2C$) interface.

Within the housing 1 is also disposed a battery compartment 12. Within the battery compartment 12 is provided a battery assembly 43, within the battery compartment 12 is provided a slideway for plugging the battery assembly 43 in and out. The battery compartment 12 is disposed at a middle bottom side within the housing 1. Through a side edge of the housing 1, a battery compartment cover may be opened to change the battery assembly 43. In order to prevent slight deviation in battery size of the same model, a layer of sponge (or foam, bubble cotton) is provided at the internal side of the battery compartment cover. The sponge structure disposed at the internal side of the battery compartment cover may also prevent battery instability caused by shock from gun shooting.

A battery circuit board is provided at an upper side of the battery assembly 43. The battery assembly 43 supplies power to various elements of the photoelectric sighting device through the battery circuit board, and meanwhile the battery circuit board is connected to the CPU core board 41 via the interface board 42.

In one embodiment, the battery assembly 43 specifically employs a voltage of 7.2-7.4V; a capacity of 3900-5700 mAh; an electrical work of 28.08 Wh-42.2 Wh; and a weight of 100-152 g.

An external key is provided at the external side of the housing 1 close to the display unit 21. The external key is connected on the socket board 42 via a key control board at the internal side of the housing 1. By touching and pressing the external key, the information on the display unit 21 may be controlled, selected and modified. The specific position of the external key is 5-10 cm away from the display unit.

The external key is specifically disposed to the right of the display unit. However, the specific position of the external key is not limited to the above position. Instead, it should be disposed at a position facilitating the user to use and press. The user controls the CPU core board 41 through the external key. The CPU core board 41 drives the display screen to display. The external key may control selection of a shooting target in a view zone displayed on the display unit, or control the photoelectric sighting device to start a laser range-finder, or control a video camera unit of the photoelectric sighting device to regulate the focal distance of the gun sight, etc.

In another embodiment, the key control board for the external key may be provided with a wireless connection unit, through which peripheral devices are connected. The periphery devices include a smart phone, a tablet computer, etc. then, program is loaded through the periphery devices, which may control selection of a shooting target in a view zone displayed on the display unit, or control the photoelectric sighting device to start a laser range-finder, or control a video camera unit of the photoelectric sighting device to regulate the focal distance of the gun sight, etc.

At the external side of the housing 1 is further provided an external slot 111. A portion of the external slot 111 disposed at the internal side of the housing is connected to the key control board. A portion of the external slot 111 disposed at the external side of the housing is connected to an external connection line 112. The external connection line 112 is connected to an external key 113 through which the user may control selection of a shooting target in a view zone displayed on the display unit, or control the photoelectric sighting device to start a laser range-finder, or control a video camera unit of the photoelectric sighting device to regulate the focal distance of the gun sight, etc.

The external line 112 may also be connected with other operation apparatus, or shooting assistance apparatus, or video display device, or for information transmission, all of the other operating devices comprise an external control key, a smart phone, a tablet computer, etc. One end of the external connection line 112 is socketed within the external socket slot 111; the other end is provided with a "U"-shaped clip. The external connection line 112 is clipped on the gun barrel through the "U"-shaped clip, thereby securing the external connection line 112 and preventing affecting shooting. In one embodiment, an operating device connected through the external connecting line 112 may select a target in the view zone, start a laser range-finder, or adjust a gun sight focal distance, etc.; the "U"-shaped clip provide simple and convenient zooming and focusing operations for a gun without a support.

The display unit 21 is a LCD display. A touch operation may be implemented on the LCD display. The size of the display may be determined based on the actual needs. In the present invention, the display screen as adopted is sized to 3.5 inches.

In one embodiment, the LCD display screen has a resolution of 320*480, the work temperature is −20±te° C., the backlight voltage is 3.3 v, and the voltage between the LCD screen and the GPU interface is 1.8 v; the touch screen is a capacitive touch screen.

Figure 9:
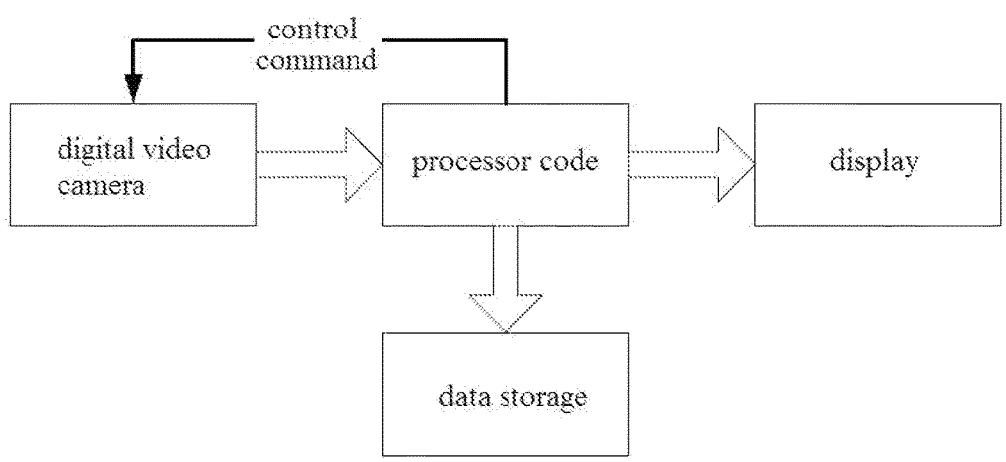
FIG. 9 shows a system diagram of field-of-view acquisition, storage, and feedback control of an electronic sighting device in an embodiment of the present invention.
Figure 10:
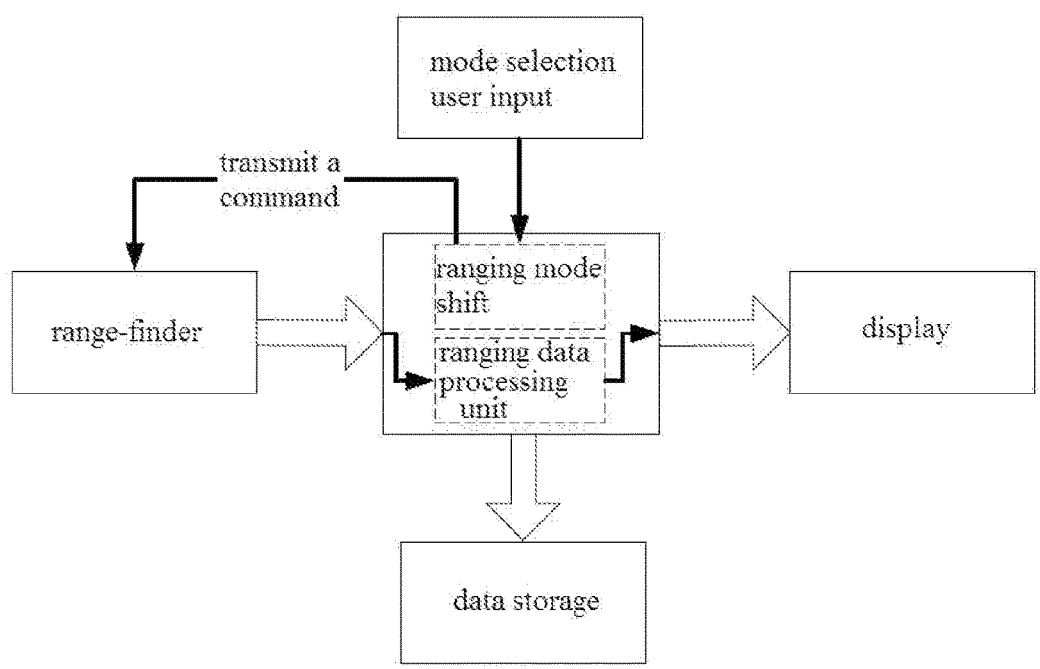
FIG. 10 shows an operation schematic diagram of a range finder of an electronic sighting device in an embodiment of the present invention.
Figure 11:
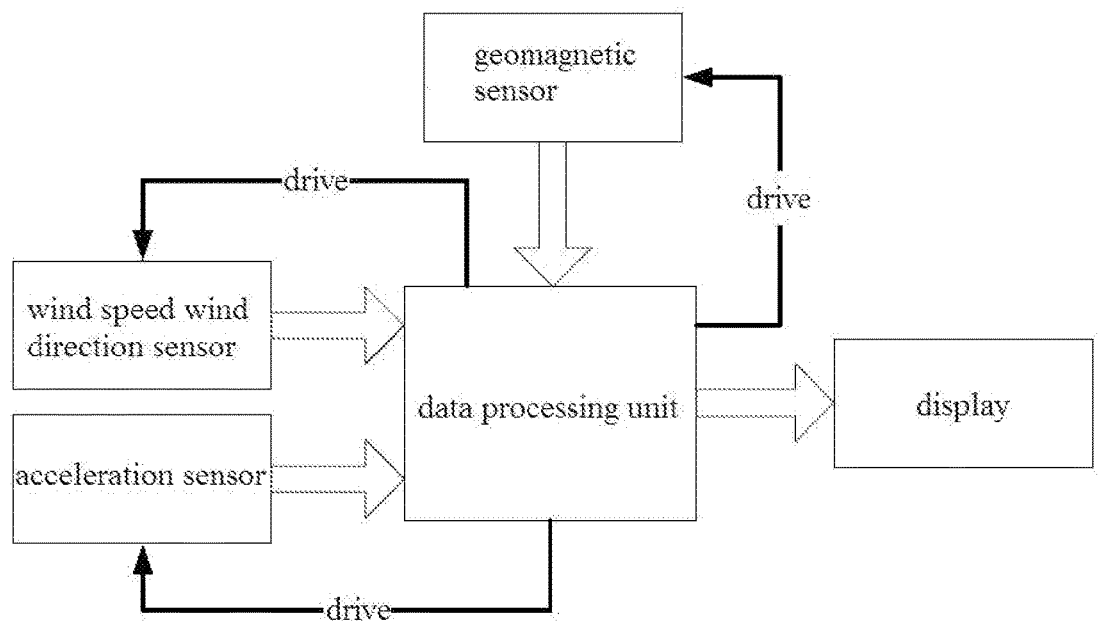
FIG. 11 shows an operation schematic diagram of a sensor module of an electronic sighting device in an embodiment of the present invention.

As shown in FIGS. 9, 10, and 11, the reticle (front sight) displayed on the display screen and the video information collected by the field-of-sight obtaining unit are superimposed. The reticle is for sighting and shooting, while the display screen also displays ancillary shooting information for facilitating shooting and transmitted by various sensors above and work indication information;

The ancillary shooting information includes environment information, distance information, and angle information;

The environment information includes wind speed data, temperature data, barometer data, and magnetic field data. The wind speed data is disposed at one end of the upper side of the display screen. The magnetic field data is disposed at a middle part of the lower side of the display screen. The temperature data and barometric data are disposed at the other end of the upper side of the display screen;

The distance information is disposed above the temperature data and barometric data;

The angle information includes the elevation angle data and azimuth angle data, where the elevation angle data is disposed beneath the wind speed data, while the azimuth angle data is disposed in the middle part of the upper side of the display screen.

The work indication information comprises battery level information, wireless signal information, remaining recording time, multiple information, shift key, and menu key;

The battery level information is disposed beneath the elevation angle data, while the remaining recording time, multiple information, and wireless signal information are disposed successively beneath the temperature data; the shift key and menu key are disposed at two ends of the lower side of the display screen.

The ancillary shooting information in the above embodiments are partially applied in a ballistic equation, and partially used for displaying to alert the user.

The photoelectric sighting device may also possibly comprise one or more ports and a radio transceiving unit. The one or more ports and radio transceiving unit may communicate with a smart phone or other terminal devices through a wired or wireless connection.

The other information includes Wi-Fi signal, battery, state shift key, menu key, remaining recording time, recording key, and current multiples. The LCD display screen provided by the present invention may perform shift between daylight/night work modes. The night work mode is implemented through infrared light compensation.

The photoelectric sighting device may also comprise a wireless transmission module. The wireless transmission module is connected to an external device through a wireless connection manner. The wireless transmission module will synchronously display the reticle, image and information displayed on the display screen to the external device;

The wireless connection manner is a WiFi connection or other wireless network connection, but not limited to these connection manners. The external device is a smart phone or other intelligent terminal device, etc.

Based on the structure of the above photoelectric sighting device, its CPU core board 41 is further connected with a memory card. Within the memory card, bullet information database and two ballistic calculation model devices are set. The user may select one of the two ballistic models based on the setting of the sensor. The ballistic models are an external ballistic 6-degree-of-freedom rigidity model and a low trajectory ballistic model, respectively. Through the two ballistic models, the photoelectric sighting device realizes a precise positioning.

In order to accurately predict the position of an impact point, the impact point is predicted using an external ballistic 6-degree-of-freedom rigidity model based on the data collected by various sensors and the bulletin data stored in the memory.

When a shot is flying in the air, the force and torque acting on the shot are mainly the acting force from the earth and aerodynamic force. Generally, the motion of the shot may be decomposed into center of mass motion and motion around the center of mass, which are described by momentum lar and law of moment of momentum.

In the 6-degree-of-freedom rigidity model, the shot in spatial movement is regarded as a rigidity. It considers three free degrees of the center of mass of the shot and three free degrees rotating around the center of mass. And all forces and torques acted on the shot are considered.

In the above model, the parameters that need to be input include: 1) atmospheric conditions: wind speed wind direction, temperature, air pressure, humidity; 2) shooting position: altitude and latitude, as well as elevation coordinates of the shooting point; 3) shooting condition: initial velocity and direction of the bullet outlet, wherein the direction is represented by the elevation angle and azimuth angle of the gun barrel; 3) bullet-target distance: obtained through a laser range-finder; 4) bullet data (stored in the database): mass of the shot, cross-section area of the shot, mass eccentricity (or rotational inertia), resistance coefficient, etc.

Figure 12:
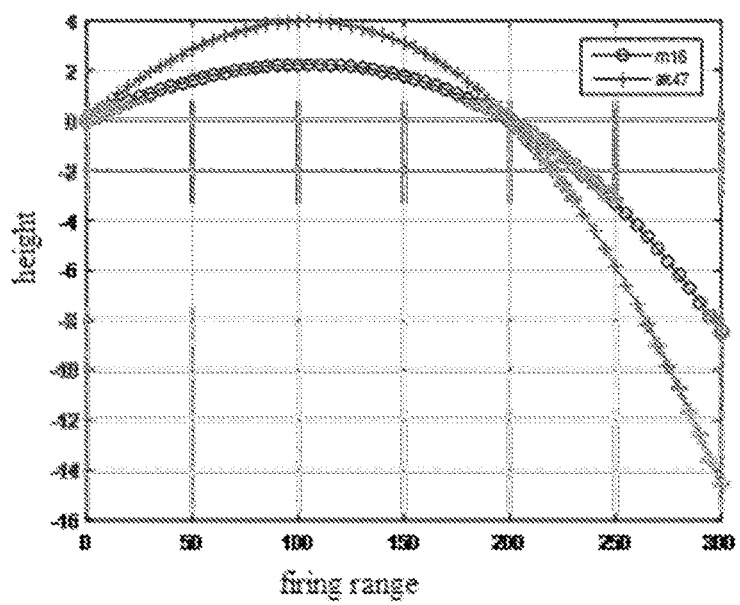
FIG. 12 shows a schematic diagram of ballistic simulation comparison for two types of bullets by an electronic sighting device in an embodiment of the present invention applying an external ballistic 6-degree-of-freedom rigidity model.
Figure 13:
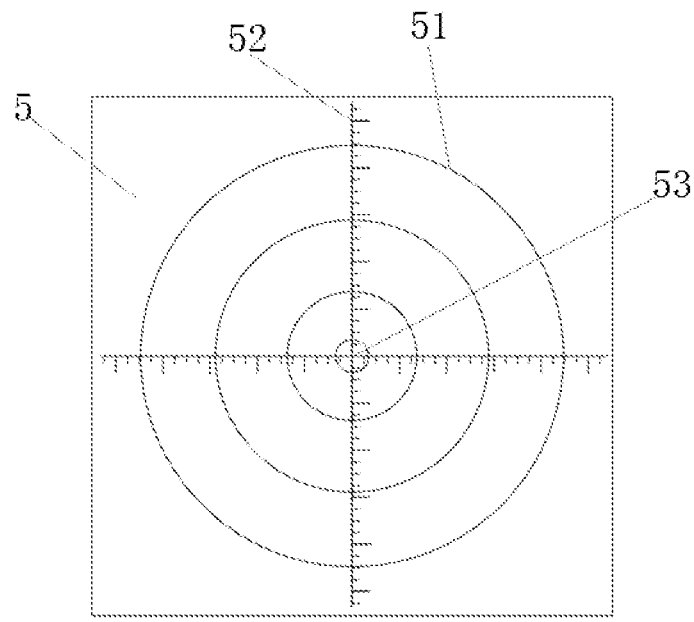
FIG. 13 shows a schematic diagram of a display screen before calibration in a calibration method of electronic sighting device in an embodiment of the present invention.
Figure 14:
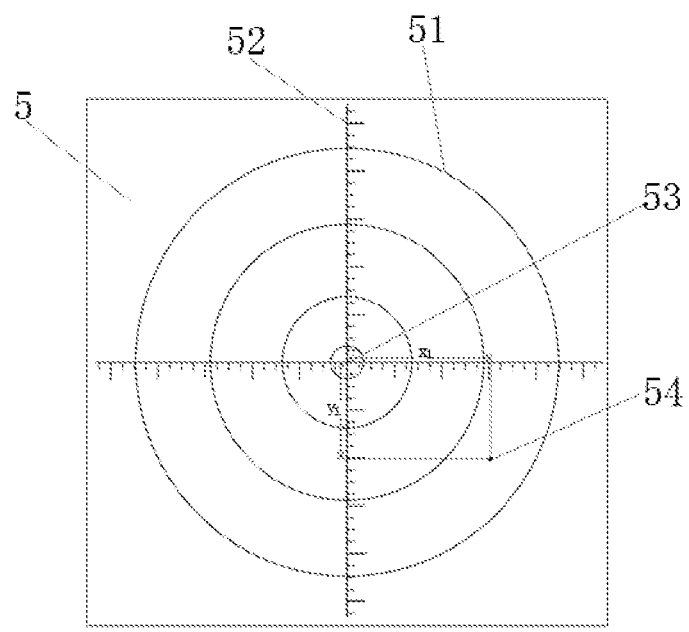
FIG. 14 shows a schematic diagram of a display screen with a first impact point in a calibration method of sighting device in an embodiment of the present invention.
Figure 15:
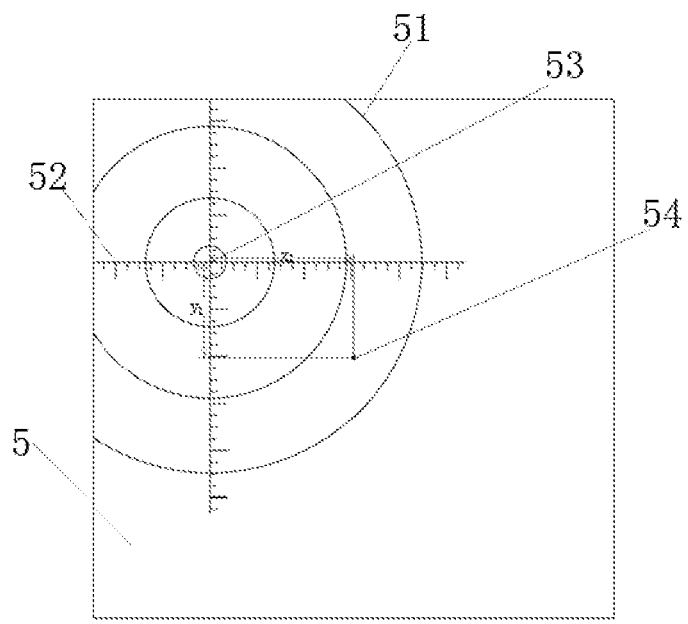
FIG. 15 shows a local enlarged view of FIG. 12 in an embodiment of the present invention.
Figure 16:
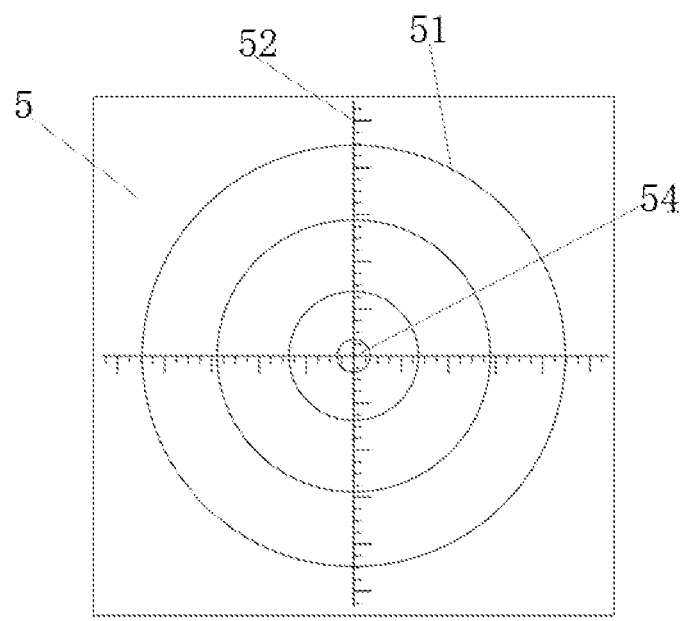
FIG. 16 shows a schematic diagram of a display screen after calibration for a first shooting in a calibration method of sighting device in an embodiment of the present invention.

FIG. 12 illustrates simulated calculations for a M16 233 Rem, 55 g, PSP shot and an AK47 (7.62×39 mm), 125 g, PSP shot. The simulation is performed only to vertical direction, and lateral direction is temporarily omitted. Supposed environment conditions: bullet-target distance 200 m, launching height 0.001 m, height 500 m, temperature 50 Fahrenheit degrees. It is seen from the figure that in order to shoot targets of a same distance, both initial launching heights are different; based on restriction conditions measured according to weather, the required launching height and launching direction are resolved; they may be regulated to hit a target at a certain distance.

In another scenario, if the wind force and wind speed are not high and the acting force of the lateral wind is very small, the low trajectory ballistic model is employed. In the low trajectory ballistic model, impacts from the low wind speed wind direction, temperature, air pressure, humidity might not be considered.

The low trajectory may be understood such that the arc variation of the bullet trajectory (i.e., parabola) approaches to a straight line. The closer to the straight line, the lower trajectory it is. Low trajectory ballistic calculation refers to ballistic calculation under a condition of small angle of fire; based on the feature that the resistance coefficient of a low-speed shot approximates a constant (specifically, for a low trajectory, under a standard weather condition, the air density function is approximately 1, the sound velocity is regarded as a constant; therefore, the resistance coefficient is a function of the bullet speed), external ballistic 6-degree-of-freedom basic equation may be simplified to resolve an equation of shooting elements of any point of the low-speed low trajectory, thereby finding a calculation method for resolving the shooting elements at the apex of the trajectory, the shooting elements at the impact point, and the point-blank range.

During the shooting process, some affecting objects (e.g., grass blown by wind) might exist to block the targeted object, thereby affecting the accuracy of the obtained range data. Therefore, in one embodiment, the laser range-finder of the photoelectric sighting device likely have a manual mode. The manual mode is specifically selecting a to-be-ranged target object on the display unit. The display unit feeds back the target object to the control unit. The control unit sets a flag to the target object and controls the laser range-finder to range the flagged target object. Only the range value of the flagged target object is read. Through the above manual ranging, the range value of the sighted object can be accurately measured, which avoids interference from other affecting objects. The control unit in the present embodiment is a CPU core board, or other unit or assembly that has an independent data processing capability.

The present invention further provides a calibration method for a photoelectric sighting device so as to realize accurate shooting during a shooting process; the calibration method is applied to an photoelectric sighting device in the above embodiments. The calibration method comprises an automatic simulated calibration and a manual calibration.

The automatic simulated calibration comprises steps of:

1. setting a target within a field of view of the photoelectric sighting device;

2. simulating a simulated impact point through one of the above ballistic models;

In the case of applying the external ballistic 6-degree-of-freedom rigidity model to simulate the impact point, collecting information of the range-finder, environment information and angle information of a plurality of sensors, bullet-related data stored in a memory card, thereby simulating the impact point;

In the case of applying the low trajectory ballistic model to simulate the impact point, under a standard weather condition, the air density constant is 1, the sound speed is a constant, the resistance coefficient is a function of bullet speed, thereby simulating the impact point;

3. watching the field of view of a display screen of the photoelectric sighting device, adjusting the reticle, and making the reticle on the display screen in coincidence with the simulated impact point;

4. accomplishing automatic simulation and calibration.

As shown in FIGS. 13-16, the manual calibration comprises steps of:

1. setting a target 51 within a field of view 5 of the photoelectric sighting device, and measuring a distance from the photoelectric sighting device to the target 51 through a laser range-finder of the photoelectric sighting device;

2. invoking a plane coordinate 52 through an external key, loading the plane coordinate 52 on the display screen, a coordinate center 53 of the plane coordinate 52 coinciding with a reticle center;

3. watching the field of view 5 of the display screen of the photoelectric sighting device, and making the coordinate center 53 of the plane coordinate 52 in alignment and coincidence with the target within the field of view;

4. after alignment and coincidence, shooting a first bullet, and obtaining a first impact point 54 on the target, the display screen print-screening an image of the first impact point 54;

5. recording values of horizontal coordinate and longitudinal coordinate of the first impact point in the plane coordinate, e.g., $x_1$, $y_1$, and regulating the field of view of the display screen of the photoelectric sighting device; moving the horizontal coordinate direction by $-x_1$; moving the longitudinal coordinate direction by $-y_1$, such that the coordinate center 53 of the plane coordinate 52 coincides with the first impact point;

6. accomplishing calibration.

Before the first calibration shooting in the above embodiment, it always occurs that the first shooting deviates greatly, and the impact point does not fall within the target in the field of view. In order to avoid occurrence of the above condition, it is proposed in one embodiment of the present invention that through a ballistic model in the above embodiment, performing simulated shooting to the target in the field of view in step 1 to find a simulated impact point; then, performing automatic simulation and calibration based on the simulated impact point; then possibly selecting the first shooting calibration. This may guarantee that the impact point of the first shooting falls on the target.

According to the calibration method provided in the present embodiment, the core controller real-time receives the environment values collected by sensors, the distance from the gun sight to the sighted object measured by the laser range-finder, and bullet information provided by the memory. The ballistic model calculates a ballistic curve of the bullet based on the real-time varied environment values, consecutive non-discrete distance information, and bullet information, thereby obtaining a simulated impact point, and real-time applies the calculated impact point to determine and regulate a reticle, such that when the photoelectric sighting device sights any sighted object at a consecutive non-discrete distance under any environment, the reticle can be regulated in real time based on a ballistic curve calculation model, such that the reticle center is close to the actual impact point, thereby achieving an effect of non-polar reticle.

In one embodiment, after the first calibration shooting is completed, in order to further enhance the preciseness, a second shooting calibration may be performed, comprising steps of:

Steps 1-5 are identical to the above embodiment, thereby omitted here;

6. performing a second shooting to shoot a second bullet, obtaining a second impact point on the target, the display screen print-screening an image having the first impact point and the second impact point;

7. recording the numerical values of the horizontal coordinate and longitudinal coordinate of second impact point in the plane coordinate, e.g., $x_2$, $y_2$, and regulating the field of view of the display screen of the photoelectric sighting device; moving the horizontal coordinate direction by $-x_2$; moving the longitudinal coordinate direction by $-y_2$, such that the center of the plane coordinate coincides with the first impact point;

8. accomplishing calibration.

In one embodiment, the display screen print-screens an image by obtaining an instruction signal transmitted from the CPU core board, the memory card caches vibration parameters generated when a plurality of guns of various models shoot bullets. The vibration parameters may include: a vibration frequency, a vibration amplitude, and a vibration duration. The CPU core board may be connected to a sensor obtaining a vibration parameter. The sensor is a vibration sensor of a known technical kind. The obtained vibration parameters are matched with vibration parameters cached in the memory card. In the case of a successful match, it is confirmed as a shooting vibration; then the core control board sends a snapshot instruction signal to the display screen to control the display screen to snapshot.

The calibration method provided by the present invention realizes accurate calibration under the current environment values by making the reticle in coincidence with the impact point through specific shooting.

The invention claimed is:

1. An electronic sighting device with real-time information interaction, comprising:
   a field-of-view obtaining unit for acquiring an image information within a sighted field of view;
   a display unit for displaying a reticle and the image information acquired by the field-of-view obtaining unit;
   a sighting circuit unit for transferring the image information from the field-of-view obtaining unit to the display unit;
   a sensor module for acquiring a movement information of the electronic sighting device and a real-time information of an environment;
   an interaction unit connected with internet or a remote display terminal, wherein the interaction unit sends signals comprising the real-time information acquired by the sensor module and the image information acquired by the field-of-view obtaining unit during a shooting process to the internet or the remote display terminal; and
   a power supply for supplying power to the electronic sighting device,
   wherein the sensor module comprises a vibration sensor and a photoelectric sensor, and the vibration sensor is affixed to a bottom of the electronic sighting device away from a direction of sighting, and the photoelectric sensor is adapted to detect a movement of a trigger of a gun.

2. The electronic sighting device with real-time information interaction according to claim 1, wherein the vibration sensor comprises a vibration sensor housing that houses, nonexclusively, a piezoelectric vibrator, a signal processing substrate, and a switch.

3. The electronic sighting device with real-time information interaction according to claim 2, wherein the piezoelectric vibrator comprises a piezoelectric member and a vibration board, wherein the piezoelectric member is affixed to the vibration board and the vibration board is affixed to the vibration sensor housing.

4. The electronic sighting device with real-time information interaction according to claim 3, wherein both the piezoelectric member and the vibration board are in a shape of a flat plate, wherein the piezoelectric member has a dimension of 4 mm in length, 2 mm in width and 0.4 mm in thickness, and is made of lead zirconate titanate, wherein the vibration board has dimensions of 5 mm in length, 2.5 mm in width and 0.5 mm in thickness, and is made of copper phosphate, and the piezoelectric member has a surface area less than that of the vibration board and is affixed to the vibration board via a binding layer having a thickness not greater than 5 μm.

5. The electronic sighting device with real-time information interaction according to claim 4, wherein the piezoelectric member is provided with a first electrode on a surface thereof facing away from the vibration board, and the vibration board is provided with a second electrode on the surface thereof facing the piezoelectric member, and the first electrode and the second electrode are connected with the signal processing substrate, wherein the signal processing substrate comprises a charge and voltage conversion processing unit, a filter processing unit and a signal amplification processing unit, wherein the first electrode and the second electrode are connected to the charge and voltage conversion processing unit, the signal amplification processing unit is connected to the power supply of the electronic sighting device.

6. The electronic sighting device with real-time information interaction according to claim 1, wherein the photoelectric sensor comprises a photosignal emission end, a photosignal reception end, a photosignal conversion unit and a photoelectric sensor wireless emission end.

7. The electronic sighting device with real-time information interaction according to claim 6, wherein the photosignal emission end and the photosignal reception end are adapted to be installed on a trigger retainer on both side of a trigger so that, when the trigger is not pulled, a photosignal emitted from the photosignal emission end is received by the photosignal reception end, and when the trigger is pulled, the photosignal emitted from the photosignal emission end is blocked by the trigger, wherein the photosignal reception end is connected with the photoelectric sensor wireless emission end, which is connected to the sighting circuit unit via the photosignal conversion unit.

8. The electronic sighting device with real-time information interaction according to claim 1, wherein the sensor module further comprises one or more selected from a group consisting of a wind speed wind direction sensor, a geomagnetic sensor, a temperature sensor, an air pressure sensor, and a humidity sensor.

9. The electronic sighting device with real-time information interaction according to claim 8, wherein the vibration sensor acquires a vibration signal of a gun, and the photoelectric sensor acquires an electric signal converted from photosignals produced after the trigger is pulled and wherein the vibration signal and the electric signal are sent to a control unit of the sighting circuit.

10. The electronic sighting device with real-time information interaction according to claim 9, wherein, when the vibration signal and the electric signal are acquired at the same time, determining that a vibration is a shooting vibration, transmitting a shooting time information and a shooting position information to the internet or the remote display terminal; and when the vibration signal and the varied electric signal are not acquired at the same time, determining that the vibration is a non-shooting vibration.

11. The electronic sighting device with real-time information interaction according to claim 1, wherein the image information acquired by the field-of-view obtaining unit on the sighting device is sent to the display terminal via internet or teletransmission.

12. The electronic sighting device with real-time information interaction according to claim 1, wherein the sighting device comprises a detachable housing that houses nonexclusively the field-of-view obtaining unit, the display unit, the sensor module, the power supply, and the sighting circuit unit; and a protection unit disposed on and fastened to a front end of the housing.

13. The electronic sighting device with real-time information interaction according to claim 12, wherein the photoelectric sighting device further comprises a range-finding unit disposed in the housing for measuring a distance information from a sighted object to the photoelectric sighting device.

14. The electronic sighting device with real-time information interaction according to claim 12, wherein the photoelectric sighting device further comprises a first field-of-view regulating unit disposed on the display unit, a second field-of-view regulating unit disposed on the housing, a third field-of-view regulating unit connected to the housing that includes an external slot, an external connection line, and one or more external keys, the external keys being connected to the external slot through the external connection line; one end of the external connection line is connected to the external slot, the other end comprises one or more end branches, each end branch being connected to an external key, wherein a U-shape security clip has one end fixedly or slidably on the external connection line.

15. The electronic sighting device with real-time information interaction according to claim 1, wherein the display unit also display nonexclusively one or more information among a wind speed data, a temperature data, a barometric data, and a magnetic field data, an elevation angle data, an azimuth angle data a battery level information, a wireless signal information, a remaining recording time information, a shift key, and a menu key.

16. The electronic sighting device with real-time information interaction according to claim 15, wherein the electronic sighting device further comprises a wireless transmission module wirelessly coupled to an external apparatus so that the reticle and information displayed on the display screen are displayed on the external apparatus simultaneously.

17. The electronic sighting device with real-time information interaction according to claim 1, wherein the sighting circuit unit comprises an interface board and a core board, a field-of-view drive circuit in the field-of-view obtaining unit, a range-finding control circuit in the range-finding unit, a key control circuit in the key unit, and a battery control circuit in the battery assembly, wherein the field-of-view drive circuit, the range-finding control circuit, and the key control circuit, and the battery control circuit are coupled with the core board through the interface board, the display driving circuit of the display unit being connected to the core board.

18. The electronic sighting device with real-time information interaction according to claim 17, wherein the core board has a memory card inserted therein, the memory card storing a bullet information database, an external ballistic 6-degree-of-freedom rigidity model, and a low trajectory ballistic model.

19. The electronic sighting device with real-time information interaction according to claim 18, wherein parameters inputted in the external ballistic 6-degree-of-freedom rigidity model are chosen from wind speed, wind direction, temperature, air pressure, humidity, longitude, latitude, and elevation coordinate of a shooting point, an initial velocity and a direction of the bullet at a gun barrel outlet, wherein the direction is represented by an elevation angle and an azimuth angle of the gun barre, a bullet-target distance obtained through the range-finding unit; and a mass of a shot, a cross-section area of the shot, a mass eccentricity of the shot, a rotational inertia of the shot, or a resistance coefficient of the shot.

20. The electronic sighting device with real-time information interaction according to claim 1, wherein the electronic sighting device is configured for manual calibration and/or automatic simulated calibration.

21. The electronic sighting device with real-time information interaction according to claim 20, wherein the automatic simulated calibration simulates an impact point using the external ballistic 6-degree-of-freedom rigidity model or the low trajectory ballistic model and coincides the reticle with the simulated impact point.

* * * * *